United States Patent Office 3,348,951
Patented Oct. 24, 1967

3,348,951
PROCESS FOR PREPARING BAKED,
STARCH-REDUCED PRODUCTS
Cyril Harry Evans, Cambridge, England, assignor to
Spillers Limited, London, England
No Drawing. Filed Mar. 1, 1966, Ser. No. 530,805
Claims priority, application Great Britain,
July 21, 1962, 28,159/62
20 Claims. (Cl. 99—86)

This application is a continuation-in-part of application Serial No. 293,890 filed July 9, 1963, now abandoned.

The present invention relates to baked products. More particularly the present invention relates to baked products which have a low starch content.

Baked products such as bread, rolls, biscuits and confectionery are made from flour usually wheaten or sometimes rye or mixtures of these cereals. Whilst satisfactory in the normal diet these products have two disadvantages in special dietary regimens. The carbohydrate content, mainly starch, is undesirable in diets which are designed to avoid or reduce obesity so that the use of these baked products is restricted to many people. However, the protein and also the fat in more recent dietetic regimens is very desirable and it is difficult to find adequate substitutes for baked products which are palatable. The other disadvantage is that such products as bread and rolls and others which contain sufficient water, undergo staling so that they must be consumed quickly or they become unpalatable. With the exception of storage at very low temperatures, the so-called "deep freeze," no method of preventing staling has yet been discovered.

It has now been found that by removing the protein from wheat flour so that it contains a minimum of starch, that is to say by using gluten, and combining the protein, i.e. gluten, with suitable starch replacement such as the germ or bran of cereals or the endosperm of oil seels or materials containing indigestible carbohydrates such as cellulose, pentosans and the like, or separated proteins of oil seeds, oil seed flours such as soya flour, or milk, it is possible to make baked or cooked products which are not only suitable for certain dietetic purposes to a degree hithertofore not achieved, but also very palatable and comparatively cheap to produce.

According to one feature of the present invention a method of preparing baked products comprises preparing a hydrated protein matrix from wheat flour protein as hereinbefore described containing a minimum of starch, and combining with a starch replacement, a texturizing agent and an aerating agent to form a dough, and promoting aeration of and baking the dough. The aeration may be attained by chemical action with or without the application of heat, such as by means of baking soda and an acid or acid salt as aerating agent, or may be attained by fermentation with yeast.

Thus according to a further feature of the present invention a method of preparing baked products comprises preparing a hydrated protein matrix from dry wheat flour protein containing a minimum of starch, and combined with a starch replacement, a texturizing agent, salt, and yeast, promoting fermentation as hereinafter described with the yeast so as to produce a risen dough, and thereafter baking said dough.

A wide variety of substances can be employed as starch substitute, for example bran and/or cooked germ of cereals such as wheat or maize, protein of oil seeds such as soybean or ground nut, protein of milk, cooked primary wheat germ from milling, soya flour prepared by milling debittered soya beans (hereinafter referred to as full-fat soya flour), or flour prepared from soya beans which have had the oil removed or partially removed, i.e. reduced from about 20% to about 1% or less either by extracting by solvents or by crushing or expelling (hereinafter referred to as low fat soya flour). It has been found that starch replacements give better products if a texturizing agent is added. Suitable agents are lecithin, sodium or calcium compounds or casein or synergetic action of both. Lecithin and caseinates are, it will be understood, only examples as other agents such as glycerine mono-sterate, or laureates or palmitates could be considered.

In as much as staling is a starch phenomenon and the products contain only a little starch, which is left after washing the wheat protein or gluten, or which is left adhering to carbohydrate materials other than starch, such as the bran of wheat or other cereal, and as this starch is somewhat further depleted during the fermentation, the staling problem is substantially reduced and normally overcome.

In order to ensure good keeping qualities of the baked products by the present invention, it is necessary, however, to prevent moisture loss and mould growth. For the high moisture products such as bread, which may contain more water than normal bread containing starch, the keeping quality may be ensured by sterile wrapping after baking or by baking in wrappings able to withstand the heat of baking. After baking, the product may be placed in a suitable plastic film, such as nylon, to withstand the temperature and afterwards autoclaved for example at a pressure of 10 lbs. per sq. in. for a period of about half an hour so as to secure a substantially sterile product.

The process can best be described by making a few simplifying assumptions which are not necessarily scientifically true and which are used for description purposes only. All the products, bread, rolls, biscuits and confectionery, are made from a "dough" or "batter" and these terms will be used in place of the names of the finished products. Dough may be regarded as a protein matrix in which are embedded particles of another substance which is either inert to or compatible with the hydrated protein during the formation of the dough and during its later manipulation and final baking or cooking, so that when the wheat protein coagulates, due to the heat, it is held in the form of bread or other products. In flours from wheat, the other substances are starch with small quantities of other carbohydrates, minerals and oil in white bread flour, and the same with the addition of bran and/or germ in brown or germ bread flour. The starch is only inert towards the protein in that the former does not contain enzymes which effect the latter or sulphur or oxidizing compounds which would cause physical changes in the nature of the protein. It is compatible in that it swells and gelatinises and helps in the formation of the structure of the product.

As aforesaid, it has been found that several substances can be used as replacements of starch but that the suitability cannot be predicted from any ordinary chemical or physical properties and that only baking trials with such modifications as are needed can supply the kind of product required. The requirements are that the dough must be suitable for handling and that the finished product, after baking, must not only be eatable, but also pleasant and attractive in colour, aroma and texture, and that it can supply some dietetic need. The modifications envisaged include, when wheat or maize germ is used as starch replacement, cooking the germ with the addition of water prior to grinding and adding up to 5% by weight of lecithin to the ground germ and, when soya flour, either full-fat or low-fat, is used as starch replacement, adding a caseinate and/or lecithin.

Such dietetic requirements are little or no starch for diabetics and reducing diets, or high protein, low starch, and normal or high fat content for certain slimming diets. Other requirements may be a high content of unsaturated fats or essential fatty acids for atherosclerosis and the provision of vitamins such as the vitamin B group, vitamin E, niacin, with the minerals iron and calcium. Again the provision of bulk in the diet is often required and best met with cellulose compounds either synthetic or natural such as bran which has laxative properties and is a good source of iron and niacin.

Most of these requirements can be supplied by the bran and germ of cereals and the protein of milk and such oil seeds as soya and groundnut and it has been found that it is possible to combine these materials, suitably treated, with wheat protein so that they replace starch in the manner described.

The protein of wheat may be used either as wet gluten or dried gluten powder provided this is "vital" or retains its properties of elasticity. Wet gluten which is a by-product of the manufacture of wheat starch, normally contains of the dry matter from 50 to 70% or more wheat protein and about 5% fatty substances and a certain amount of unremoved starch. The fatty substances are of course present in the dry powder and are an essential part of the protein matrix. For the purpose of this invention wet gluten may be used if this is available or dried vital gluten may be used. The latter differs only from the former in the removal of water and wet gluten normally contains ⅔ of its weight of water. If dry gluten is conveniently used time should be allowed for its hydration with water whether the dry gluten is reconstituted by itself or as part of a dry premix which may be convenient. In considering the amount of dry gluten to use, account must be taken of the quality and for the purpose of the examples the protein content should not be less than 70%. The ratio of protein to other substance is best described with reference to the latter product as wet gluten is somewhat variable but normally contains about one third of its weight of dry solids, mainly protein, but with some lipids and other substances. The quality of the gluten, i.e. strong and elastic, or soft and extensible, depends on the wheat variety from which the flour was milled and this quality must also be taken into account as, in fact, is the case with ordinary flour. In wheat flour this ratio of starch to protein varies very considerably and may be in the range of from 10:1 to 5:1. I have found that for satisfactory results with starch substitute the lower ratio is more appropriate but must be varied both with the percentage of protein in wheat gluten and starch substitute substances.

The following examples will serve to illustrate the principles of the process:

*Example 1*

200–250 parts by weight wet gluten (or equivalent weight of dry gluten)
400 parts by weight finely ground bran containing 5% by weight of lecithin
2 parts by weight salt
20 parts by weight yeast
300 parts by weight water (varied to suit dough) (and increased by about twice the weight of dry gluten if dry gluten is used).

Note: Wet gluten can be regarded as containing ⅔ vols. water so that equivalent weight of dry gluten would be 66–83 parts by weight: the total weight of dry ingredients would be 494–511 parts and the percentage of dry gluten from 13.36% to 16.24%.

The wet gluten is placed in a bakery mixer preferably of a high speed type and the bran added slowly until the gluten begins to mix, the yeast is then added in a part of the water. As the mixing proceeds more bran and water are added until the dough clears. The salt and lecithin are conveniently added to the bran beforehand. The lecithin may be commercial lecithin as normally supplied to the baking industry and as such is usually soya bean lecithin. The basic mixing is improved by the addition of the lecithin and may be still further improved, if desired, by the addition of 50 parts by weight of an oil, such as cotton-seed, soya or maize. The amount of wet gluten can be varied beyond the above limits, which cover natural variations in quality, if a different type of product is required. Less gluten will quickly lead to a brittle dough of little cohesion which cannot be handled but more gluten will give increased volume until the toughness makes the product approach a gluten roll nature.

If the rather bitter taste of the bran is undesirable the bran may be given any extractive treatment required before grinding.

There is suffcient starch adhering to the bran to allow a limited fermentation with yeast. If therefore wet gluten is used or gluten is hydrated with water, the dough should be mixed until it resembles a normal yeast and flour dough and then, after a brief recovery period, the dough is scaled off, tinned and, after proving at about 100° F. for a suitable period, normally about 45 minutes, the bread is baked in the normal way. If, for convenience, the dry gluten is incorporated with the other ingredients as a premix, then, on adding the water and making the dough, time must be allowed for the gluten to hydrate. Normally a period of about 30 minutes is adequate after which, if the mixing has been correct, the dough also resembles normal dough and can be handled in exactly the same way.

The product resembles brown bread and has quite good eating qualities and keeps very well if baked in cellophane. The dietetic value lies in the low calorie content due to the indigestible portion of the bran and also the bulk and laxative properties of the bran and also to the very low starch content.

*Example 2*

A very nutritious and palatable product may be made by substituting suitably prepared wheat germ or suitably prepared maize germ for the whole or part of the bran in the recipe given in Example 1. The wheat germ or maize germ may be almost free from bran or contain a considerable proportion such as is found in the "primary" germ from flour mills. Suitable treatment to prevent rancidity and give colour and flavour consists in cooking the germ or germs in steam jacketted worms for periods of up to three hours with frequent addition of water after which the material is ground. Additions of lecithin of about 5% by weight of the germ and of edible oils are and may be made respectively as in Example 1.

The water added must be adjusted to produce a good dough when using wet gluten and the quantity will depend on the moisture content of the germ or germ and bran product and must be increased as already mentioned if dry gluten is used, either separately or as a premix with the germ, by an amount equal to about twice the weight of dry gluten. As in Example 1 the dough should be given suitable fermentation before baking. As already mentioned in Example 1 there is sufficient starch present adhering to the bran and there is sufficient starch present in commercial wheat germ to allow a limited fermentation with yeast. If, therefore, wet gluten is used or gluten is hydrated with water, the dough should be mixed until it resembles a normal yeast and flour dough and then, after a brief recovery period the dough is scaled off, tinned and, after proving at about 100° F. for a suitable period, normally about 45 minutes, the bread is baked in the normal way. If, for convenience, the dry gluten is incorporated with the other ingredients as a premix, then, on adding the water and making the dough, time must be allowed for the gluten to hydrate. Normally a period of about 30 minutes is adequate after which, if the mixing has been correct, the dough also resembles normal dough and can be handled in exactly the same way.

The bread or rolls or biscuits baked from this dough are of a good brown colour, appetising taste and appearance. Keeping quality is excellent if moulding is prevented. The dietetic qualities are: very low starch content, good roughage (depending on the proportion of bran), useful content of unsaturated oils (which are augmented by the oil addition if required), a good source of vitamins of the

Example 3

It is not essential to use wet gluten but this example, which is a variation of Examples 1 and 2, illustrates the use of dry gluten.

30 parts by weight dry gluten
95 parts by weight cooked wheat germ containing 5% of lecithin by weight
6 parts by weight yeast
3 parts by weight salt
about 140 parts by weight water.

Note: The total weight of dry ingredients is 135 parts and the proportion of dry gluten is $30/135$ or 22.2%. The dry gluten is hydrated with the water for about one hour and is placed in a bakery mixer of the high speed type. If for convenience, the dry gluten is incorporated with the wheat germ, the procedure already mentioned for Examples 1 and 2 should be followed, about half an hour allowed for hydration. The wheat germ, salt and yeast are then added and dough formed. The dough is divided or scaled off and yeast fermentation of about 45 minutes is then allowed prior to baking in the normal way. The baked product is of a good brown colour, satisfactory in taste and appearance, and with good keeping properties. It has a low starch content and good roughage.

Where the colour and strong flavour of the previous Examples 1, 2 and 3 would make the product an unsatisfactory substitute for white bread which has a bland flavour and can be eaten with meat or jam or other products without objection, the protein of certain oil seeds can be used instead of bran as starch replacements in the formula given in Example 1 with rather unexpected results in some cases. The protein may either be extracted as such, or contained together with oil in "flour" made from the oil seed, or contained in extracted "flour." Either enzyme inactivated soya flour (full-fat soya flour) or extracted soya flour (low-fat soya flour) may be used as a starch replacement and produces a fairly good dough but the baked products, whilst low in fibre content and free from starch, are rather yellow in colour and produce a rather close textured product with a slight beany taste which is not objectionable unless special modifications to the recipe are made by adding a texturizing agent.

Example 4

Soya flour is very suitable for use as starch replacement and the disadvantage mentioned above can be obviated if texturizing agent such as a caseinate or lecithin is added.

A 450 parts by weight full-fat soya flour
15 parts by weight lecithin
30 parts by weight calcium or sodium caseinate
12 parts by weight salt

B 120 parts by weight dry gluten
approx. 480 parts by weight water
40 parts by weight yeast.

Note: The total weight of dry ingredients is 667 parts so that the proportion of dry gluten is $120/667$ or 17.99%. The ingredients listed under A are mixed together in dry state to form a premix. The gluten is hydrated with the water for at least one hour and is placed in a bakery mixer of the high speed type: the premix together with the yeast is added and dough formed. Alternatively if the dry gluten is added to the premix, an appropriate quantity of extra water will be needed and then, on adding the water and making the dough, time must be allowed for the gluten to hydrate. Normally a period of about 30 minutes is adequate. The dough is divided or scaled off and yeast fermentation of about 45 minutes is then allowed prior to baking in the normal way. There is a certain amount of sugar in soya flour to allow a limited fermentation with yeast. This bread has a very low carbohydrate content and is suitable for diabetic patients.

Extracted protein is also palatable and that of soya and arachis nuts is very suitable and useful. Products have been made from solvent extracted oil seed proteins; a mixture of 250 parts by weight wet gluten and 400 parts by weight groundnut protein which has been solvent extracted, together with 20 parts by weight yeast and sufficient water produced a dough of excellent nature which proved well and produced well risen bread of colour, flavour and general appearance resembling white bread.

Puff pastry made from this formula with addition of fat is very satisfactory and with the addition of eggs a wide range of the Savarin and Baba type of goods may be made. (Savarins are a very rich type of fermented goods. A Baba contains dried fruit and a Savarin is a plain dough. See "Cake Making" by Bennion and Stewart, published by Leonard Hill, 9 Eden Street, London.)

Example 5

For dietetic regimens where a baked product with a minimum starch content is not quite so essential, for example for diabetics for whom a small percentage of starch may be permissible, and for reducing diets, part of the soya flour in Example 4, up to about ⅓, can be replaced by wheat flour and a baked product produced which still has a greatly reduced starch content as compared with conventional white or wholemeal bread.

A 300 parts by weight full fat soya flour
150 parts by weight wheat flour
15 parts by weight lecithin
30 parts by weight calcium or sodium caseinate
12 parts by weight salt

B 120 parts by weight dry gluten
approx. 480 parts by weight water

C 40 parts by weight yeast.

Note: The total weight of dry ingredients is 667 parts so that the proportion of dry gluten is $120/667$ or 17.99%. The ingredients listed under A are mixed together in dry state to form a premix. The gluten is hydrated for at least one hour and placed in a bakery mixer of the high speed type: the premix together with the yeast is added and dough formed. There is a certain amount of sugar in soya flour to allow a limited fermentation with use. Alternatively if the dried gluten is added to the premix, an appropriate quantity of extra water will be needed and then, on adding the water and making the dough, time must be allowed for the gluten to hydrate. Normally, a period of about 30 minutes is adequate. The dough is divided or scaled off and yeast fermentation of about 45 minutes is then allowed prior to baking in the usual way.

Pastry and biscuits can be made from this formula with the omission of the yeast and the addition of fat in a conventional manner.

Example 6

Milk products may be used as starch replacements but there are certain difficulties with casein in its various forms which need special precautions. Replacing the bran of Example 1 with dried skimmed milk powder produces very excellent products as regards appearance, palatability and good white colour. However, the high lactose content makes the goods unsuitable for certain dietetic purposes. The casein of the milk powder or its calcium compound also behave in a rather unusual way in that it acquires good plastic properties only at elevated temperatures and absorbs a great deal of water. The result is that it is difficult, if a dough is made of normal plasticity, to bake out the product satisfactorily without excessive crust colour due to the lactose content. The difficulties can be overcome to a large extent by making a very dry dough which will be suitably plastic when heated or in baking in a cooler oven and removing before baking is complete. The goods then collapse after the manner of a souffle and can be kept if required for a considerable period, days if necessary; when placed in a hot oven the goods again swell and make a good, well risen article.

*Example 7*

A particularly good dietetic baked product may be prepared by combining the ingredients of Examples 3 and 5 in about equal proportions with an increase in dry gluten. Where wet gluten is not available as such and dry gluten has to be used, it is an advantage to premix all the ingredients with the possible exception of salt and yeast: such a premix enables a complete dietetic flour to be available for distribution and can be baked with little variation from normal procedure.

Premix:

| | |
|---|---|
| Parts by weight cooked wheat germ or cooked maize germ containing 5% lecithin (see note below) | 35.3 |
| Parts by weight full fat soya flour | 22.4 |
| Parts by weight wheat flour | 10.85 |
| Parts by weight sodium or calcium caseinate | 2.15 |
| Parts by weight lecithin (see note below) | 1.3 |
| Parts by weight dry gluten | 28.0 |
| | 100.0 |

Note: It is convenient to add commercial liquid lecithin to the wheat germ or maize germ after cooking and to add lecithin provided to the premix, such powder being made by spray drying an emulsion of lecithin in skim milk and containing about 50% lecithin. However, the lecithin can be made in a single addition, if desired.

Dough:

448 parts by weight (12 lb. 0 oz.) of premix
10 parts by weight (10 oz.) of yeast
8 parts by weight (8 oz.) of salt
400 parts by weight (25 lb. 0 oz.) of water.

Note: The proportion of dry gluten in the premix is 28% and of al the dry ingredients in the dough $125.4/466$ or 26.92%.

The dry ingredients and the water are placed in a bakery mixer preferably of the high speed type and mixed to form a dough. The dough is allowed to stand for ½ hour in order to allow for hydration of the gluten. The dough is then divided or sealed off and proved in tins for about 50 minutes at a temperature of about 100° F. to allow for yeast fermentation. It is then baked for about 40 minutes with an oven temperature of about 380° F. to 400° F.

Care should be taken not to overmix the dough: it is desirable to judge the correctness of the mixing only on the dough after the standing time and not immediately after mixing. If the mixing is correct the dough, after the standing time, should resemble normal bread dough and be able to be handled by the usual mechanical plant employed in machine bakeries.

Contrary to what would be expected, the product so produced is not intermediate in appearance between those made in Examples 3 and 5, but is actually better than either. It is believed that there is a synergetic effect of the texturising agents or an effect on the germ of the soya flour.

*Example 8*

The premix of Example 7 can alseo be used for the production of a biscuit or crispbread of the so-called "Swedish" type which is fermented with yeast.

Dough:

104 parts by weight (9 lbs. 10 oz.) of the premix of Example 7
6 parts by weight (1½ oz.) of yeast
1 part by weight (¼ oz.) of salt
80 parts by weight (1 lb. 4 oz.) of water.

Note: The proportion of dry gluten in the premix is 28% and of all the dry ingredients in the dough $29.12/111$ or 26.33%.

Mix gently until all the dry ingredients have been wetted. Do not overmix but stop mixing when a dead inelastic dough similar to a rye dough obtains. Allow the dough to stand for about 60 to 75 minutes for fermentation of the yeast. Roll the dough out in a sheet through an aperture of 1 mm., allow the dough to relax and then cut into pieces. After about 30 minutes proof bake for about 8 minutes at an oven temperature of about 420° F. The baking time will be dependent upon the thickness of the dough sheet and the temperature of the oven. The crisp-bread may have to be dried after baking though it it possible, by suitably selecting the dough sheet thickness, oven temperature and baking time, to avoid a separate drying stage.

It is also possible to produce biscuits or crispbread of other types such as the so-called "English" type which are raised not by yeast fermentation but by chemical aerating agents. The following three examples are illustrative of such crispbreads.

*Example 9*

Premix:

| | |
|---|---|
| Parts by weight dried gluten | 27.8 |
| Parts by weight cooked and ground wheat germ containing 5% lecithin | 72.2 |
| | 100.0 |

Dough:

100 parts by weight of premix
1 part by weight of ammonium carbonate
0.6 part by weight of salt (if desired)
80 parts by weight, of water.

Note: The proportion of dry gluten is 27.8% of the premix and, of all the dry ingredients, $27.8/101.6$ or 27.26%.

Mix the premix with ammonium carbonate, salt (if desired) and water to a dough. Roll out into a thin sheet and bake for about 8 minutes at an oven temperature of about 420° F. After baking and cooling cut or saw the sheet into rectangular shapes.

*Example 10*

Premix:

| | |
|---|---|
| Parts by weight dried gluten | 20.4 |
| Parts by weight full fat soya flour | 51.1 |
| Parts by weight wheat flour | 25.5 |
| Parts by weight of lecithin powder prepared by spray drying an emulsion of lecithin in skim milk and containing about 50% lecithin | 3.0 |
| | 100.0 |

Dough:

100 parts by weight of premix
1 part by weight of ammonium carbonate
0.6 part by weight of salt (if desired)
64 parts by weight of water.

Note: The proportion of dry gluten is 20.4% in the premix and of the total dry ingredients $20.4/101.6$ or 20%.

Mix, roll, bake, cool and cut as described in Example 9.

The starch replacements illustrated in the foregoing examples can be extended to similar products and mixtures of any or all will produce a very wide range of products which can be varied to suit the dietetic need or the palatability of the article. The following examples are illustrative of form of biscuit or crispbread.

Example 11

Premix:

| | |
|---|---|
| Parts by weight dried gluten | 19.8 |
| Parts by weight enzyme inactivated full fat soya flour | 49.5 |
| Parts by weight wheat flour | 0.7 |
| Parts by weight lecithin powder prepared by spray drying an emulsion of lecithin in skim milk and containing about 50% lecithin | 6.0 |
| | 76.0 |

Dough:

20 parts by weight of premix
5 parts by weight vegetable fat
1 part by weight sesame seed
1 part by weight sesame pulp
7 parts by weight water
Vanilla to taste.

Note: The proportion of dry gluten in the premix is 19.8/76 or 26%.

Rub the fat into the premix and then incorporate the sesame seed and the sesame pulp. When smooth add the water and mix until clear. Roll out the dough into thin sheet form: cut into rectangular or other desired shape, and bake for about 8 minutes with an oven temperature of about 420° F.

Example 12

Premix:

| | |
|---|---|
| Parts by weight dried gluten | 26.4 |
| Parts by weight enzyme inactive full fat soya flour | 33.0 |
| Parts by weight wheat flour | 25.1 |
| Parts by weight cooked wheat germ | 11.5 |
| Parts by weight lecithin powder prepared by spray drying an emulsion of lecithin in skim milk and containing about 50% lecithin | 4.0 |
| Parts by weight saccharine | 0.02 |
| | 100.02 |

Dough:

17.5 parts by weight of premix
5 parts by weight vegetable fat
5 parts by weight water.

Rub the vegetable fat into the dry premix until smooth, and then add the water and mix until clear. Roll out the dough into thin sheet form, cut into desired shapes and bake for about 8 minutes with an oven temperature of about 420° F.

An analysis of the foregoing examples will show that the percentage of dry gluten varies from as little as about 13% in Example 1 to about 27% in Example 7 (28% in the premix). These proportions are by way of example only and the percentage of gluten, expressed as dry gluten, used may vary not only between these values, but may also be lower than or even higher than such values, though it is not envisaged that the percentage of dry gluen should be less than 10% or greater than 30%.

We claim:

1. A process for preparing baked starch-reduced dietetic products comprising the steps of forming a dough from wheat protein, at least one starch replacement ingredient selected from the group consisting of cooked wheat germ, wheat bran, protein of soya beans, protein of ground nuts, protein of milk, and enzyme inactivated full fat soya flour, at least one texturizing agent selected from the group consisting of lecithin, sodium caseinate, and calcium caseinate, yeast, and water, the dry ingredients of said dough comprising about 18% dry gluten by weight, promoting fermentation with said yeast so as to produce a risen dough, and thereafter baking said dough for a period of time sufficient to produce a moist baked product.

2. A process for preparing baked starch-reduced dietetic products comprising the steps of forming a dough from wheat protein, at least one starch replacement ingredient selected from the group consisting of cooked wheat germ, wheat bran, protein of soya beans, protein of ground nuts, protein of milk, and enzyme inactivated full fat soya flour, at least one texturizing agent selected from the group consisting of lecithin, sodium caseinate, and calcium caseinate, yeast, and water, the dry ingredients of said dough comprising about 22% dry gluten by weight, promoting fermentation with said yeast so as to produce a risen dough, and thereafter baking said dough for a period of time sufficient to produce a moist baked product.

3. A process for preparing baked starch-reduced dietetic products comprising the steps of forming a dough from wheat protein, at least one starch replacement ingredient selected from the group consisting of cooked wheat germ, wheat bran, protein of soya beans, protein of ground nuts, protein of milk, and enzyme inactivated full fat soya flour, at least one texturizing agent selected from the group consisting of lecithin, sodium caseinate, and calcium caseinate, yeast, and water, the dry ingredients of said dough comprising about 18 to 22% dry gluten by weight, promoting fermentation with said yeast so as to produce a risen dough, and thereafter baking said dough for a period of time sufficient to produce a moist baked product.

4. A process for preparing baked starch-reduced dietetic products comprising the steps of forming a dough from wheat protein, at least one starch replacement ingredient selected from the group consisting of cooked wheat germ, cooked maize germ, wheat bran, protein of soya beans, protein of ground nuts, protein of milk, enzyme inactivated full fat soya flour, and low fat soya flour, at least one texturizing agent selected from the group consisting of lecithin, sodium caseinate, and calcium caseinate, yeast, and water, the dry ingredients of said dough comprising about 10% to 30% dry gluten by weight, promoting fermentation with said yeast so as to produce a risen dough, and thereafter baking said dough for a period of time sufficient to produce a baked product.

5. A process as claimed in claim 4 in which salt is included in the dough.

6. A process as claimed in claim 4 in which the dry ingredients of said dough comprise about 13% to 27% dry gluten by weight.

7. A process as claimed in claim 4 in which the starch replacement ingredient is wheat bran and the texturizing agent is lecithin and is equal by weight to about 5% of the weight of the bran.

8. A process as claimed in claim 7 in which the dry ingredients of the dough comprise about 13% to about 16% of dry gluten by weight.

9. A process as claimed in claim 4 in which the starch replacement ingredient is at least one selected from the group consisting of cooked wheat germ, cooked maize germ and wheat bran, and the texturizing agent is lecithin equal by weight to about 5% of the weight of the starch replacement ingredient.

10. A process as claimed in claim 9 in which the dry ingredients of the dough comprise about 13% to about 16% of dry gluten by weight.

11. A process as claimed in claim 4 in which the starch replacement ingredient is cooked wheat germ and the texturizing agent is lecithin equal by weight to about 5% of the weight of the cooked wheat germ.

12. A process as claimed in claim 11 in which the dry ingredients of the dough comprise about 22% of dry gluten by weight.

13. A process as claimed in claim 4 in which the starch replacement ingredient is full fat soya flour and the texturizing agent is lecithin and one selected from the group consisting of sodium caseinate and calcium caseinate.

14. A process as claimed in claim 13 in which the dry ingredients of the dough comprise about 18% of dry gluten.

15. A process as claimed in claim 13 in which the dry ingredients of the dough comprise a proportion of wheat flour up to about one half of the full fat soya flour by weight.

16. A process as claimed in claim 15 in which the dry ingredients of the dough comprise about 18% of dry gluten.

17. A process as claimed in claim 4 in which the starch replacement ingredients are full fat soya flour and at least one selected from the group consisting of cooked wheat germ and cooked maize germ and the texturizing agent is lecithin and one selected from the group consisting of sodium caseinate and calcium caseinate, and in which the dry ingredients of the dough comprise a proportion of wheat flour up to about one half of the full fat soya flour by weight.

18. A process as claimed in claim 17 in which the dry ingredients of the dough comprises about 27% of dry gluten.

19. A process of preparing baked starch-reduced dietetic products comprising the steps of forming a dough from wheat protein, at least one starch replacement ingredient selected from the group consisting of cooked wheat germ, cooked maize germ, wheat bran, protein of soya beans, protein of ground nuts, protein of milk, enzyme inactivated full fat soya flour and low fat soya flour, lecithin as texturizing agent, a non-toxic chemical aerating agent and water, the dry ingredients of the dough comprising about 10% to about 30% of dry gluten, rolling the dough into thin sheet form, baking the sheet and cutting the baked sheet to form a baked biscuit shaped product.

20. A process of preparing baked starch reduced dietetic products comprising the steps of forming a dough from wheat protein, at least one starch replacement ingredient selected from the group consisting of cooked wheat germ, cooked maize germ, wheat bran, protein of soya beans, protein of ground nuts, protein of milk, enzyme inactivated full fat soya flour, and low fat soya flour, lecithin as texturizing agent, yeast and water, the dry ingredients of the dough comprising about 10% to about 30% of dry gluten, promoting fermentation with said yeast to produce a risen dough, rolling the dough into thin sheet form, baking the dough and cutting the sheet to form baked biscuit shaped products.

References Cited

UNITED STATES PATENTS

| | | | |
|---|---|---|---|
| 1,843,051 | 1/1932 | Thiele | 99—90 |
| 1,936,718 | 11/1933 | Jordan | 99—90 |
| 2,009,274 | 7/1935 | Quashing et al. | 99—90 |
| 2,506,358 | 5/1950 | Harrel et al. | 90—83 |
| 2,708,631 | 5/1955 | Neiman | 99—83 X |
| 3,066,029 | 11/1962 | Jeffreys | 99—90 |

FOREIGN PATENTS

| | | |
|---|---|---|
| 563,503 | 9/1958 | Canada. |
| 593,516 | 10/1947 | Great Britain. |

OTHER REFERENCES

Richard: "Bread, Rolls and Sweet Doughs," Bakers Helper Co., Chicago, Ill., 1923, pages 106 and 107.

RAYMOND N. JONES, *Primary Examiner.*

A. LOUIS MONACELL, *Examiner.*